(12) United States Patent
Gao et al.

(10) Patent No.: US 12,499,014 B2
(45) Date of Patent: Dec. 16, 2025

(54) METHOD AND APPARATUS FOR SYSTEM BACKUP, MEMORY, AND ELECTRONIC DEVICE

(71) Applicant: Beijing Xiaomi Mobile Software Co., Ltd., Beijing (CN)

(72) Inventors: Shan Gao, Beijing (CN); Chihming Lin, Beijing (CN); Yingmei Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/641,083

(22) Filed: Apr. 19, 2024

(65) Prior Publication Data
US 2025/0110836 A1    Apr. 3, 2025

(30) Foreign Application Priority Data
Sep. 28, 2023    (CN) .......................... 202311282675.5

(51) Int. Cl.
*G06F 16/14*    (2019.01)
*G06F 11/14*    (2006.01)

(52) U.S. Cl.
CPC ................................ *G06F 11/1458* (2013.01)

(58) Field of Classification Search
CPC ............. G06F 11/1458; G06F 11/1461; G06F 11/1469
See application file for complete search history.

(56) References Cited

U.S. PATENT DOCUMENTS

| 8,868,882 B2 * | 10/2014 | Ali .......................... G06F 13/28 711/202 |
| 11,436,108 B1 | 9/2022 | Jourdain et al. |
| 2013/0311429 A1 * | 11/2013 | Agetsuma ........... G06F 11/1451 707/640 |
| 2020/0007655 A1 * | 1/2020 | Namiranian .......... H04W 76/23 |
| 2023/0058980 A1 | 2/2023 | Jorapur et al. |

FOREIGN PATENT DOCUMENTS

CN    109408278 A    3/2019

OTHER PUBLICATIONS

Extended European Search Report issued in Application No. 24172680.1 dated Oct. 10, 2024, 9 pages.
The First Office Action for Chinese Application No. 202311282675.5, dated Aug. 28, 2022, 22 pages.

* cited by examiner

*Primary Examiner* — Loc Tran
(74) *Attorney, Agent, or Firm* — Finnegan, Henderson, Farabow, Garrett & Dunner, L.L.P.

(57) ABSTRACT

A method for a system backup, includes: backing up a system mapping table before a system file is updated, wherein the system mapping table includes at least one first storage address, and each first storage address corresponds to an address where first system file data is currently stored in a memory; retaining, in response to that the system file is updated, the first system file data in the memory; and storing updated second system file data in the memory and determining an updated system mapping table.

18 Claims, 8 Drawing Sheets

--- backing up a system mapping table before a system file is updated — 101 in response to that the system file is updated, retaining the first system file data in the memory; and storing updated second system file data in the memory and determining an updated system mapping table — 102

METHOD AND APPARATUS FOR SYSTEM BACKUP, MEMORY, AND ELECTRONIC DEVICE

CROSS REFERENCE TO RELATED APPLICATION

This disclosure is based upon and claims priority to Chinese Patent Application No. 202311282675.5, filed on Sep. 28, 2023, the entire content thereof is incorporated herein by reference.

TECHNICAL FIELD

The present disclosure relates to a field of communication, and more particularly, to a method and an apparatus for a system backup, a memory, and an electronic device.

BACKGROUND

At present, an electronic device may backup system file data in a memory to avoid system update failure. However, such a backup manner may occupy a large amount of storage space in the memory, which in turn affects operational performance of the electronic device. The manner for the system backup needs to be optimized.

SUMMARY

According to a first aspect of embodiments of the present disclosure, a method for a system backup includes:
  backing up a system mapping table before a system file is updated, where the system mapping table includes at least one first storage address, and each first storage address corresponds to an address where first system file data is currently stored in a memory;
  retaining, in response to that the system file is updated, the first system file data in the memory; and
  storing updated second system file data in the memory and determining an updated system mapping table.

According to a second aspect of embodiments of the present disclosure, a memory is configured to:
  back up and store a system mapping table before a system file is updated, where the system mapping table includes at least one first storage address, and each first storage address corresponds to an address where first system file data is currently stored in the memory;
  in response to that the system file is updated, retain the stored first system file data; and
  store updated second system file data and store an updated system mapping table.

According to a third aspect of embodiments of the present disclosure, an electronic device is includes:
  a processor; and
  a memory;
  where the processor is configured to: send a backup instruction to a memory before a system file is updated;
  where the memory is configured to: back up a system mapping table based on the backup instruction, where the system mapping table includes at least one first storage address, and each first storage address corresponds to an address where first system file data is currently stored in the memory;
  retain the first system file data in response to that the system file is updated; and
  store updated second system file data and an updated system mapping table.

It should be understood that the foregoing general description and the following detailed descriptions are exemplary and explanatory only and do not limit the present disclosure.

BRIEF DESCRIPTION OF THE DRAWINGS

The accompanying drawings herein are incorporated into and form part of the specification, illustrate embodiments consistent with the present disclosure, and are used to explain the principles of the present disclosure in conjunction with the specification.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

A method for a system backup provided in the present disclosure is described below, first from a first device side.

Figure 1:
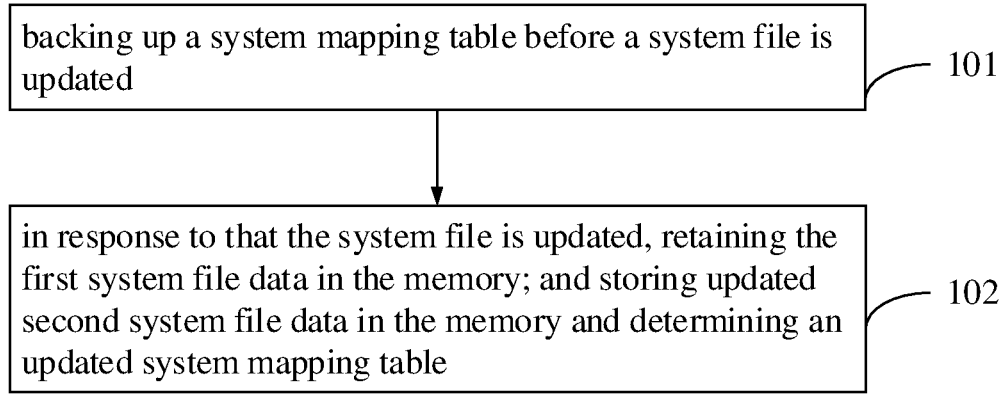
FIG. 1 is a flowchart of a method for a system backup, according to an exemplary embodiment of the present disclosure.

Referring to FIG. 1, FIG. 1 is a flowchart of a method for a system backup according to an exemplary embodiment of the present disclosure. The embodiment is described from a side of an electronic device, which may include but is not limited to, a mobile phone, a laptop computer, a desktop computer, a tablet computer, and the like. As shown in FIG. 1, the method for the system backup may include the following steps 101-102.

In step 101, a system mapping table is backed up before a system file is updated.

In some embodiments, the system mapping table includes at least one first storage address, and each first storage address corresponds to an address where first system file data is currently stored in a memory.

The memory may include but is not limited to a storage device such as a flash. The memory may also refer to a storage chip, which is not limited in the present disclosure.

Figure 2A:
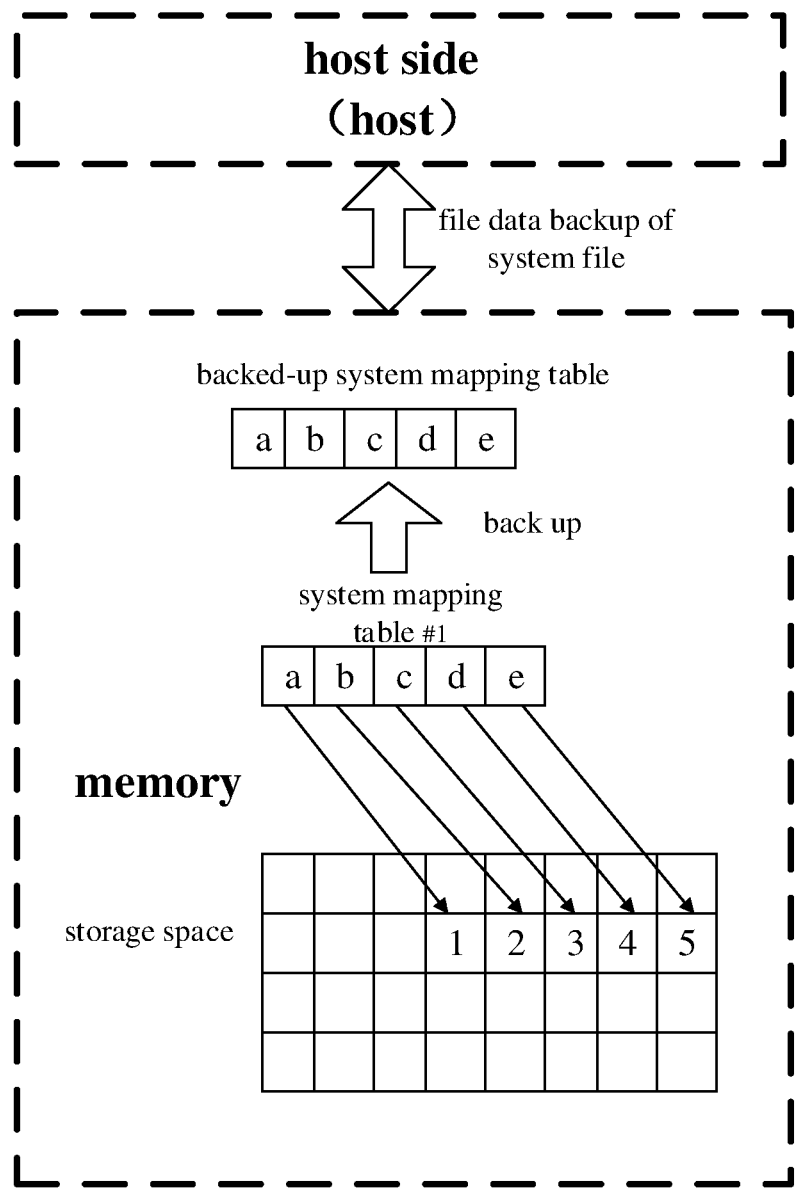
FIG. 2A is a schematic diagram of a scenario for backing up a system mapping table, according to an exemplary embodiment of the present disclosure.

For example, as shown in FIG. 2A, the first system file data includes data 1 to data 5, respectively corresponding to storage addresses a, b, c, d, and e. A current system mapping table #1 includes the storage addresses a, b, c, d, and e. The electronic device may back up the system mapping table #1.

In some embodiments, a processor of the electronic device, such as a Central Processing Unit (CPU), may serve as a host of the electronic device to send a backup instruction to the memory.

The memory may back up the system mapping table, such as the system mapping table #1, as shown in FIG. 2A, based on the backup instruction.

In step 102, in response to that the system file is updated, the first system file data is retained in the memory; and updated second system file data is stored in the memory and an updated system mapping table is determined.

In some embodiments, the memory does not delete the first system file data previously stored.

In some embodiments, the following manner, which is not limited in the present disclosure, may be adopted to store the updated second system file data in memory, where
  incremental data of the second system file data relative to the first system file data is stored;
  the incremental data is stored in the memory.

In an example, when the system file is updated, only some of its functions may be upgraded, i.e., there is generally common data between the second system file data and the first system file data, and the common data is not changed.

In addition, file data, that is changed relative to the first system file data, of the second system file, may be referred to as the incremental data. That is, the data that belongs to the second system file data but does not belong to the first system file data may be referred to as the incremental data. The incremental data is the updated second system file data.

In the embodiment of the present disclosure, after the incremental data of the second system file data relative to the first system file data is determined, the incremental data may be stored in the memory.

For example, the first system file data includes data 1 to data 5, the second system file data includes data 1 to data 3, and data 6 and data 7, where the incremental data is data 6 and data 7.

Figure 2B:
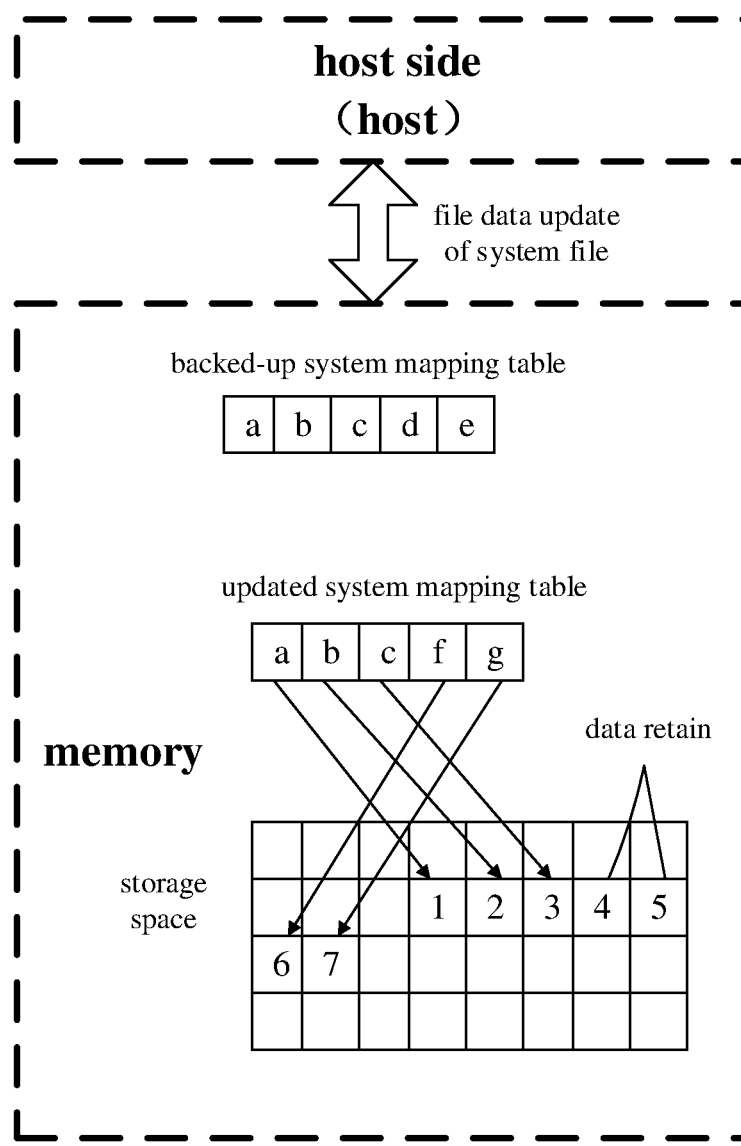
FIG. 2B is a schematic diagram of a scenario for updating a system mapping table, according to an exemplary embodiment of the present disclosure.

The memory may store the incremental data while retaining the first system file data, as shown in FIG. 2B, the memory may store data 1 to data 7.

In some embodiments, the updated system mapping table may be determined in the following manner, where:
  a second storage address of the incremental data in the memory is determined;
  common data of the first system file data and the second system file data is determined;
  it is determined that that the updated system mapping table includes the first storage address of the common data and the second storage address of the common data.

For example, the second storage address of the incremental data in the memory may be determined first, as shown in FIG. 2B, the incremental data includes data 6 and data 7, respectively corresponding to storage addresses f and g, and the second storage addresses includes a storage address f and a storage address g.

Furthermore, it may be determined the common data between the first system file data and the second system file data, as shown in FIG. 2B, the common data includes data 1 to data 3. The first storage addresses corresponding to the common data includes a storage address a, a storage address b, and a storage address c.

In the embodiment of the present disclosure, the updated system mapping table may include the first storage addresses for common data and the above second storage addresses. For example, as shown in FIG. 2B, the updated system mapping table, i.e., the system mapping table #2, includes the storage address a, the storage address b, the storage address c, the storage address f, and the storage address g.

In the embodiment of the present disclosure, it is not necessary to back up all the system file data when a system backup is performed. For example, when the first system file data includes data 1 to data 5, the second system file data includes data 1 to data 3, and data 6 to data 7, it is not necessary to back up all the first system file data. When the system file is updated again, it is also not necessary to back up all the second system file data. In the present disclosure, it merely requires to back up the system mapping table #1, and when the system file is updated again, the system mapping table #2 may be backed up.

In the above embodiments, through backing up the system mapping table and retaining the historical system file data, the system file may be backed up, so as to reduce the storage space occupied by the memory, which has high availability.

Figure 3:
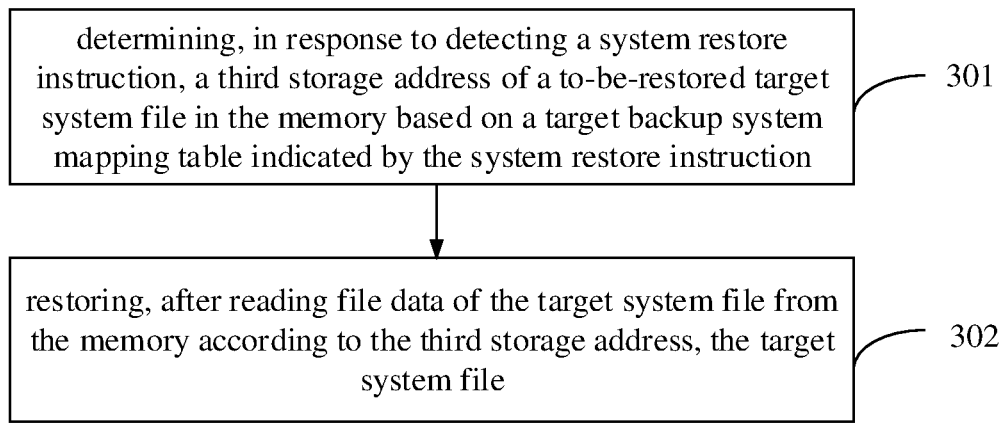
FIG. 3 is a flowchart of a method for system restoration, according to an exemplary embodiment of the present disclosure.

Referring to FIG. 3, FIG. 3 is a flowchart of a method for system restoration provided based on the method for the system backup shown in the embodiment of FIG. 1. As shown in FIG. 3, the embodiment is described from the side of the electronic device, and the method for system restoration may include the following steps 301 and 302.

In step 301, in response to detecting a system restore instruction, a third storage address of a to-be-restored target system file in the memory is determined based on a target backup system mapping table indicated by the system restore instruction.

In some embodiments, the electronic device may receive the system restore instruction sent by another electronic device, the another electronic device may be other electronic device external to the electronic device, which may include but is not limited to a mobile phone, a laptop computer, a desktop computer, a tablet computer, and the like.

In some embodiments, after the OTA upgrade for the system file fails and the electronic device establishes connection with the another electronic device, the electronic device may receive the system restore instruction sent by the another electronic device through the connection.

In some embodiments, the electronic device may establish wireless connection with the another electronic device, and the connection may include but is not limited to the wireless connection such as Bluetooth, infrared, Zigbee and the like.

In some embodiments, the electronic device may establish wired connection with the another electronic device, which is not limited in the present disclosure. In some embodiments, the processor of the first device, such as the CPU, may serve as the host to receive the system restore instruction sent by the another electronic device.

In some embodiments, the electronic device may also have the system restore instruction automatically generated by the processor, for example, in a recovery mode, the CPU may automatically generate the system restore instruction.

The manner for detecting the system restore instruction is not limited in the present disclosure.

In some embodiments, the system restore instruction may indicate a target backup system mapping table.

The target backup system mapping table is one of the system mapping tables backed up by the memory.

The target backup system mapping table is configured to indicate a third storage address where the file data of the target system file is stored in the memory of the first device.

In some embodiments, the electronic device may determine the third storage address of the to-be-restored target system file in the memory based on the target backup system mapping table indicated by the system restore instruction.

In step 302, after file data of the target system file is read from the memory according to the third storage address, the target system file is restored.

In some embodiments, the electronic device may adopt a snapshot recovery manner, to restore the target system file after reading the file data of the target system file from the memory according to the third storage address.

In an example, the snapshot recovery manner is a data recovery manner typically used to recover data from the file system or the database system, in order to return to a data state at a certain point in time in the past. The file system or data is usually recovered by creating a pointer to each data block or each file.

In the embodiment of the present disclosure, the target backup system mapping table is a pre-created pointer, and the first device may restore the target system file according to the target backup system mapping table, so as to restore the system of the electronic device to the target system corresponding to the target system file.

In the above embodiment, the electronic device may restore the target system file based on the target backup system mapping table indicated by the system restore instruction. The system may be recovered without using specialized ROM flashing software and without losing user data, which has high availability.

Figure 4:
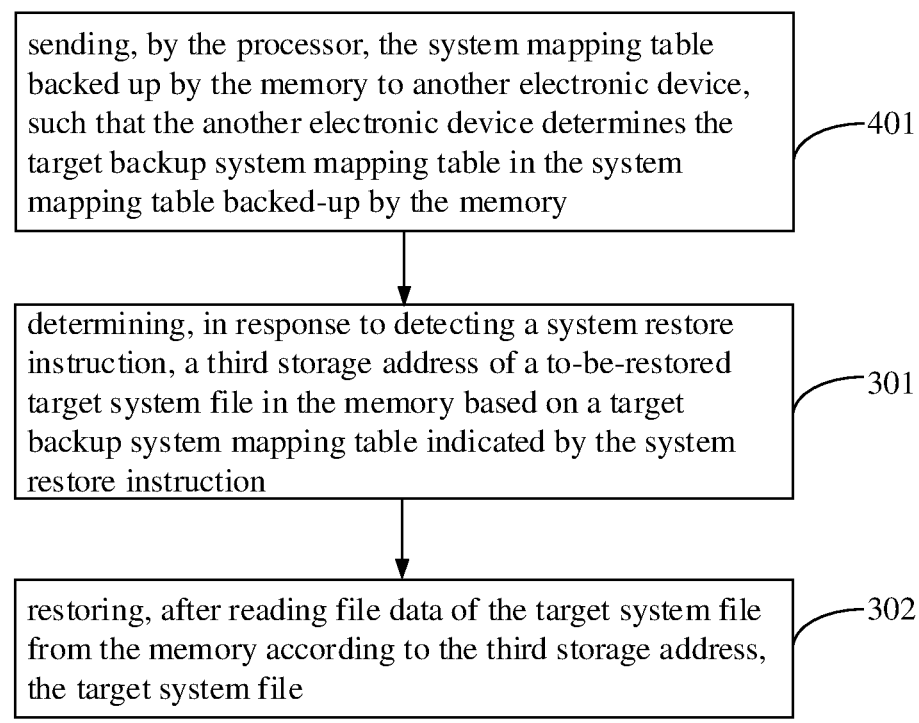
FIG. 4 is a flowchart of a method for system restoration, according to an exemplary embodiment of the present disclosure.

In some embodiments, referring to FIG. 4, FIG. 4 is a flowchart of a method for system restoration according to the embodiment shown in FIG. 3 of the present disclosure. Before performing the step 301, the method for system restoration may further include the following step 401.

In step 401, the processor sends the system mapping table backed up by the memory to another electronic device, such that the another electronic device determines the target backup system mapping table in the system mapping table backed up by the memory.

For example, the processor may send the system mapping table backed up by the memory to another electronic device through wireless connection or wired connection between the devices.

After receiving the system mapping table, the another electronic device may display the backed-up system mapping table that is received, and the user may determine the target backup system mapping table. Alternatively, the another electronic device may determine the target backup system mapping table based on a preset rule. The manner in which another electronic device determines the target backup system mapping table is not limited in the present disclosure.

The another electronic device may send the target backup system mapping table to the electronic device through the system restore instruction. The electronic device may continue to perform above steps 301 to 302 to restore the target system file.

In the above embodiment, the system file may be restored to the target system file specified in a plurality of previously backed-up system files, without using specialized ROM flashing software to complete system restoration, and the system may be recovered without losing the user data, which has high availability.

In some embodiments, the backed-up system mapping table, the system mapping table, and the system file data may be stored in the memory, and read/write operations of the electronic device may be managed through the system mapping table. The storage addresses a, b, c, d, and e correspond to addresses of file data 1, file data 2, file data 3, file data 4, and file data 5 of the first system file stored in the memory, as shown in FIG. 2A.

The processor may send a backup instruction to the memory. After receiving the backup instruction from the processor, the memory may immediately back up a system mapping table in the memory, to obtain the backed-up system mapping table #1, and may retain the first system file data in the storage space from this point on, for example, as shown in FIG. 2A.

When the system file is updated, as shown in FIG. 2B, the incremental data in the second system file data that does not belong to the first system file data includes file data 6 and file data 7, and the corresponding second storage addresses include storage addresses f and g. At this time, the processor does not send a backup instruction to the memory, and the backed-up system mapping table in the memory is still the backed-up system mapping table #1.

Figure 5:
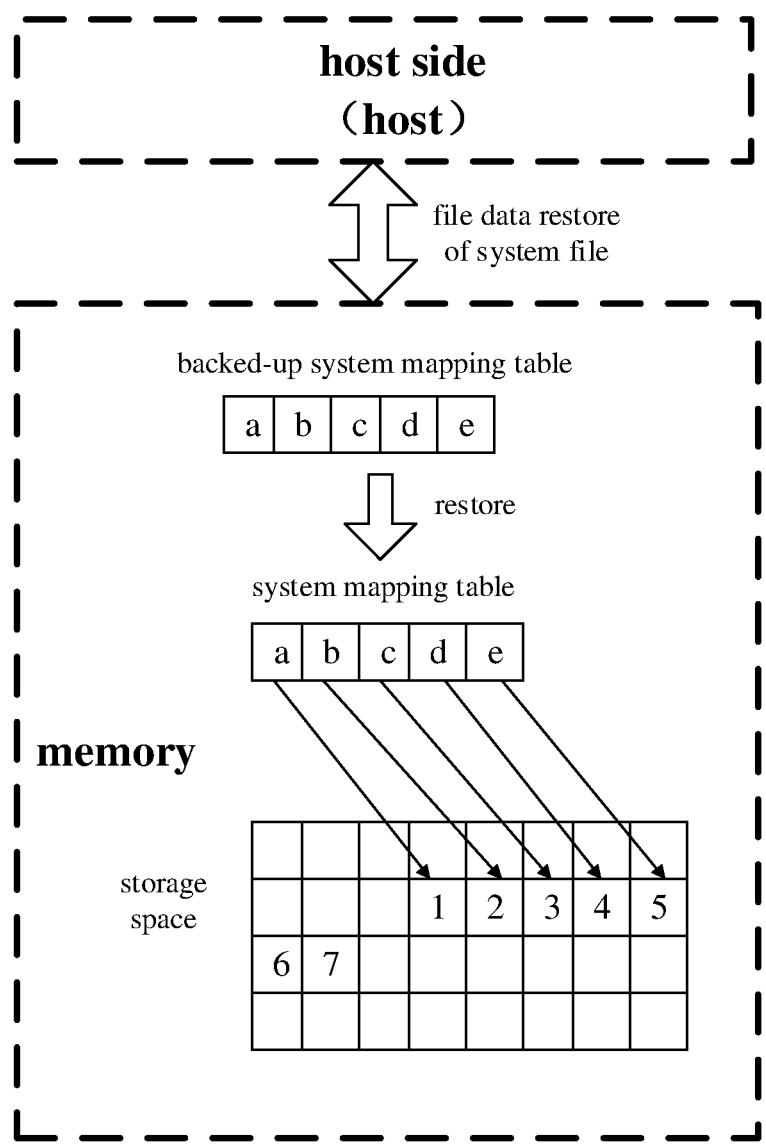
FIG. 5 is a schematic diagram of a scenario for performing system restoration based on a backed-up system mapping table, according to an exemplary embodiment of the present disclosure.

When the processor of the first device receives the system restore instruction sent by the second device, as shown in FIG. 5, the system restore instruction is used to indicate the target backup system mapping table, i.e. the backed-up system mapping table #1.

The first device may adopt a snapshot recovery manner, based on the backed-up system mapping table #1, to respectively read the file data 1, file data 2, file data 3, file data 4, and file data 5 according to the storage addresses a, b, c, d, and e, after obtaining the target system file, the target system file is restored. Thus, the system is restored to the target system corresponding to the target system file, and the memory level system restore function may be achieved.

In the above embodiments, the system is recovered without using specialized ROM flashing software and without losing user data, which has high availability.

In some embodiments, the above method for system backup and the above method for system restoration provided in the present disclosure may also be applied to other scenarios, including but not limited to a debugging process for the electronic device before or after delivery. It may be understood that the solution of the present disclosure may also be extended to the backup and restore of application layer data if the storage space of the memory is large enough.

In some embodiments, the present disclosure also provides a memory, and the memory is configured to:

back up a system mapping table before a system file is updated, where the system mapping table includes at least one first storage address, and each first storage address corresponds to an address where first system file data is currently stored in the memory;

in response to that the system file is updated, retain the stored first system file data; and store updated second system file data and store an updated system mapping table.

In some embodiments, the memory is further configured to:

back up, in response to receiving a backup instruction from a processor, the system mapping table based on the backup instruction.

In some embodiments, the memory is further configured to:

store incremental data of the second system file data relative to the first system file data.

In some embodiments, the updated system mapping table stored in the memory includes:

a first storage address of common data, where the common data is common system file data of the first system file data and the second system file data; and a second storage address of the incremental data.

In some embodiments, the processor may read file data corresponding to the storage address from the memory for system restoration.

In some embodiments, the memory may include but is not limited to a storage device such as a flash. The memory may also refer to a storage chip, which is not limited in the present disclosure.

Corresponding to the method embodiments for implementing the application functions, embodiments of the present disclosure further provides apparatus for implementing the application functions.

Figure 6:
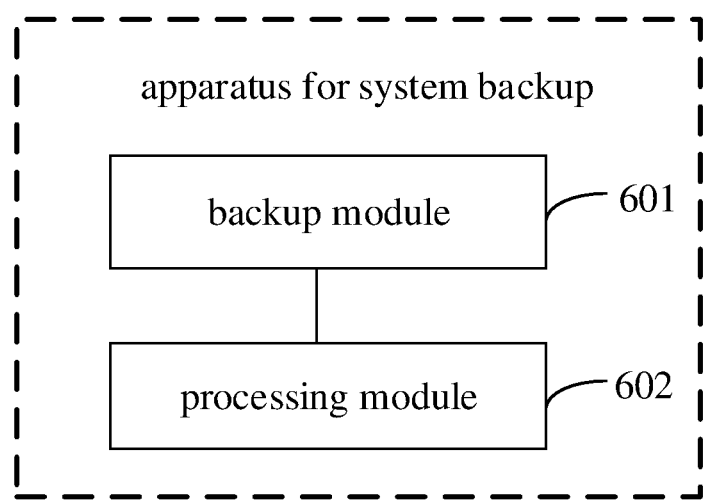
FIG. 6 is a block diagram of an apparatus for a system backup, according to an exemplary embodiment of the present disclosure.

Referring to FIG. 6, FIG. 6 is a block diagram of an apparatus for a system backup according to an exemplary embodiment, and the apparatus includes a backup module 601, configured to back up a system mapping table before a system file is updated, where the system mapping table includes at least one first storage address, and each first storage address corresponds to an address where first system file data is currently stored in a memory; and a processing module 602, configured to retain the first system file data in the memory in response to that the system file is updated; and store updated second system file data in the memory and determine an updated system mapping table.

As for the apparatus embodiments, since they basically correspond to the method embodiments, reference may be made to the relevant part of the description of the method embodiments. The apparatus embodiments described above are merely illustrative, and the units described above as separate components may or may not be physically separated, and the components displayed as units may or may not be physical units. That is, they may be located in one location, or it may be distributed to multiple network units. Some or all of the modules may be selected according to actual needs to achieve the objectives of the solutions of the present disclosure. Those skilled in the art is able to understand and implement it without creative work.

Correspondingly, the present disclosure also provides a computer-readable storage medium for storing a computer program, and the computer program, when executed by a processor, causes the processor to implement the methods for the system backup described above.

Correspondingly, the present disclosure also provides an electronic device including:

a processor; and a memory;

where the processor is configured to: send a backup instruction to a memory before a system file is updated;

where the memory is configured to:

back up a system mapping table based on the backup instruction, where the system mapping table includes at least one first storage address, and each first storage address corresponds to an address where first system file data is currently stored in the memory;

retain the first system file data in response to that the system file is updated; and store updated second system file data and an updated system mapping table.

Correspondingly, the present disclosure also provides an electronic device including:

a processor; and the memory according to any one of the above memories.

Figure 7:
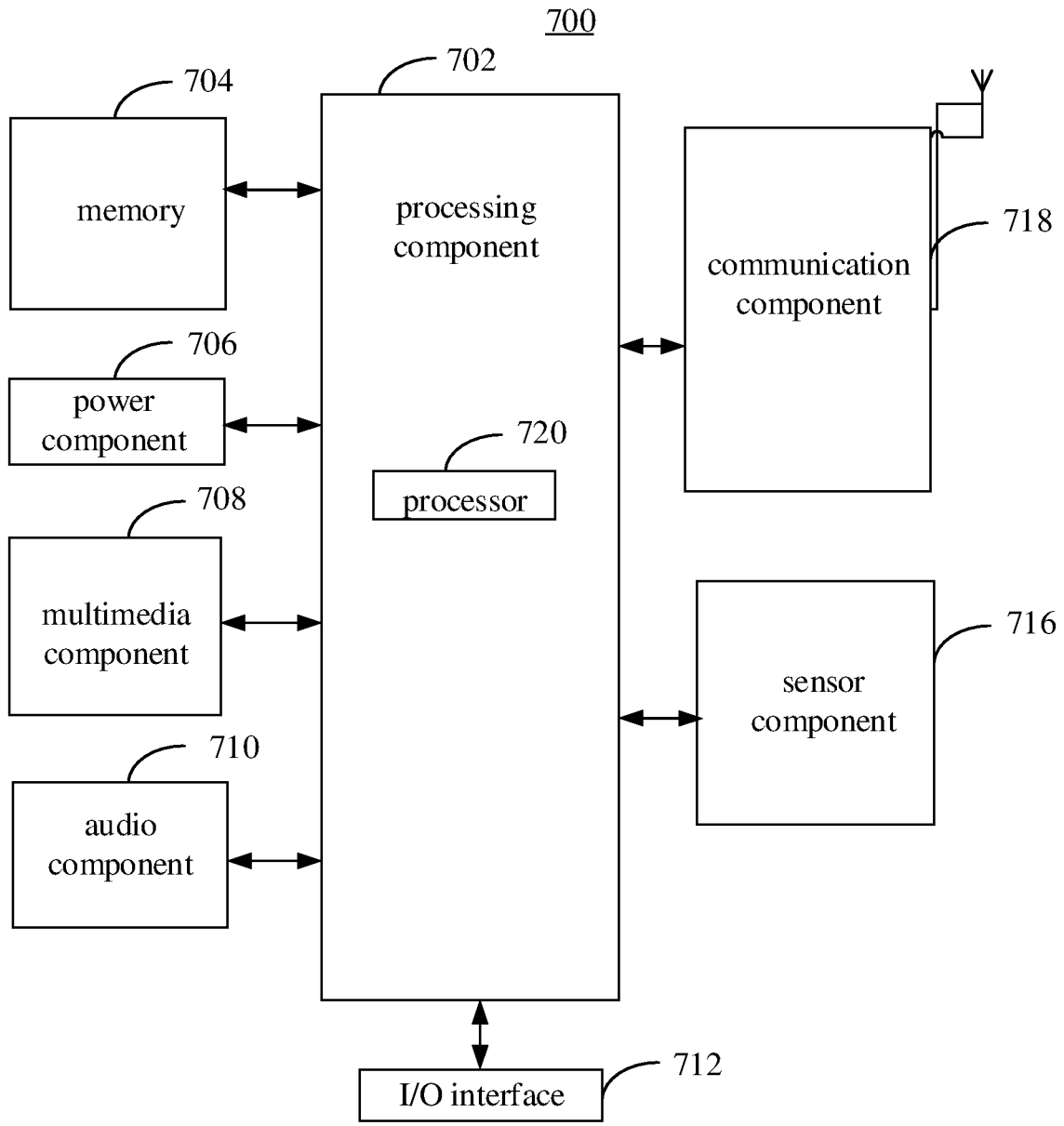
FIG. 7 is a block diagram of an electronic device, according to an exemplary embodiment of the present disclosure.

FIG. 7 is a block diagram of an electronic device 700 according to an exemplary embodiment. For example, the device 700 may be a terminal device such as a mobile phone, a computer, a digital broadcast terminal, a messaging device, a gaming console, a tablet, a medical device, exercise equipment, and a personal digital assistant. The terminal device may correspond to the above first device or second device.

Referring to FIG. 7, the device 700 may include one or more of the following components: a processing component 702, a memory 704, a power component 706, a multimedia component 708, an audio component 710, an Input/Output (I/O) interface 712, a sensor component 716, and a communication component 718.

The processing component 702 is typically configured to control overall operations of the device 700, such as operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For example, the processing component 702 may include a multimedia module to facilitate the interaction between the multimedia component 708 and the processing component 702.

One of the processors 720 in the processing component 702 may be configured to: perform any one of above methods for system backup.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 706 may provide power to various components of the device 700. The power component 706 may include a power management system, one or more power sources, and any other components associated with the generation, management and distribution of power in the device 700.

The multimedia component 708 may include a screen providing an output interface between the device 700 and the user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 708 includes a front camera and/or a rear camera. The front camera and/or the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a Microphone (MIC) configured to receive an external audio signal when the device 700 is in an operation mode, such as a call mode, a recording mode, and a voice recognition mode. The received audio signal may be further stored in the memory 704 or transmitted via the communication component 718. In some embodiments, the audio component 710 further includes a speaker to output audio signals.

The I/O interface 712 may provide an interface between the processing component 702 and peripheral interface modules, such as a keyboard, a click wheel, or buttons. The buttons may include, but are not limited to, a home button, a volume button, a starting button, and a locking button.

The sensor component 716 may include one or more sensors to provide status assessments of various aspects of the device 700. For example, the sensor component 716 may detect an open/closed status of the device 700, and relative positioning of components. For example, the component is the display and the keypad of the device 700. The sensor component 716 may also detect a change in position of the device 700 or a component of the device 700, a presence or absence of user contact with the device 700, an orientation or an acceleration/deceleration of the device 700, and a change in temperature of the device 700. The sensor component 716 may include a proximity sensor configured to detect the presence of nearby objects without any physical contact. The sensor component 716 may also include a light sensor, such as a Complementary Metal Oxide Semiconductor (CMOS) or Charge Coupled Device (CCD) image sensor, for use in imaging applications. In some embodiments, the sensor component 716 may also include an acceleration sensor, a gyroscope sensor, a magnetic sensor, a pressure sensor, or a temperature sensor.

The communication component 718 is configured to facilitate communication, wired or wirelessly, between the device 700 and other devices. The device 700 may access a wireless network based on a communication standard, such as WiFi, 3G, 4G, 5G, 6G or a combination thereof. In one exemplary embodiment, the communication component 718 receives a broadcast signal or broadcast associated information from an external broadcast management system via a broadcast channel. In one exemplary embodiment, the communication component 718 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the device 700 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In exemplary embodiments, there is also provided a non-transitory computer-readable storage medium including instructions, such as included in the memory 704, executable by the processor 720 of the device 700 to implement the above described methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

The technical solution provided in the embodiments of the present disclosure may include the following beneficial effects:

In the present disclosure, the electronic device may back up the system mapping table in advance before the system file is updated, when the system file is updated, the first system file data before the update may be retained in the memory, and updated second system file data may be stored in the memory, and an updated system mapping table may be determined. In the present disclosure, through backing up the system mapping table and retaining the historical system file data, the system file may be backed up, so as to reduce the storage space occupied by the memory, which has high availability.

It is to be noted that relational terms "first", "second" and the like in the disclosure are adopted only to distinguish one entity or operation from another entity or operation and not always to require or imply existence of any such practical relationship or sequence between the entities or operations. Terms "include" and "comprise" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for a system backup, comprising:
   backing up a system mapping table before a system file is updated, wherein the system mapping table comprises at least one first storage address, and each first storage address corresponds to an address where first system file data is currently stored in a memory;
   retaining, in response to that the system file is updated, the first system file data in the memory;
   storing updated second system file data in the memory and determining an updated system mapping table;
   determining, in response to detecting a system restore instruction, a third storage address of a to-be-restored target system file in the memory based on a target backup system mapping table indicated by the system restore instruction, wherein the target backup system mapping table is one of system mapping tables backed up by the memory; and restoring, after reading file data of the to-be-restored target system file from the memory according to the third storage address, the to-be-restored target system file.

2. The method according to claim 1, wherein backing up the system mapping table comprises:

sending, by a processor, a backup instruction to the memory; and backing up, by the memory, the system mapping table based on the backup instruction.

3. The method according to claim 1, wherein storing the updated second system file data in the memory comprises:

determining, in second system file data, incremental data not belonging to the first system file data; and storing the incremental data in the memory.

4. The method according to claim 3, wherein determining the updated system mapping table comprises:

determining a second storage address of the incremental data in the memory;

determining common data between the first system file data and the second system file data; and determining that the updated system mapping table comprises a first storage address of the common data and a second storage address of the common data.

5. The method according to claim 1, further comprising:

detecting, in response to determining that an over the air (OTA) upgrade for the system file fails, whether the system restore instruction is received.

6. The method according to claim 1, wherein detecting the system restore instruction comprises:

detecting that a processor receives the system restore instruction; or detecting that the processor generates the system restore instruction.

7. The method according to claim 1, wherein before detecting the system restore instruction, the method further comprises:

sending, by a processor, the system mapping table backed up by the memory to another electronic device, such that the another electronic device determines the target backup system mapping table in the backed-up system mapping table.

8. The method according to claim 1, wherein restoring the to-be-restored target system file comprises:

restoring, after reading file data of the to-be-restored target system file from the memory according to the third storage address, the to-be-restored target system file in a snapshot recovery manner.

9. A memory device, comprising:
a memory processor; and
a memory,
wherein the memory processor is configured to:
back up a system mapping table before a system file is updated, wherein the system mapping table comprises at least one first storage address, and each first storage address corresponds to an address where first system file data is currently stored in the memory;
in response to that the system file is updated, retain the first system file data; and
store updated second system file data and store an updated system mapping table,
wherein a third storage address of a to-be-restored target system file in the memory is determined based on a target backup system mapping table indicated by a system restore instruction, wherein the target backup system mapping table is one of system mapping tables backed up by the memory; and after file data of the to-be-restored target system file is read from the memory according to the third storage address, the to-be-restored target system file is restored.

10. The memory device according to claim 9, wherein the memory processor is further configured to:

back up, in response to receiving a backup instruction from a processor, the system mapping table based on the backup instruction.

11. The memory device according to claim 9, wherein the memory processor is further configured to:

store incremental data of the second system file data relative to the first system file data.

12. The memory device according to claim 11, wherein the updated system mapping table stored in the memory comprises:

a first storage address of common data, wherein the common data is common system file data of the first system file data and the second system file data; and a second storage address of the incremental data.

13. An electronic device, comprising:
a device processor; and
a memory device including a memory and a memory processor;
wherein the device processor is configured to send a backup instruction to the memory device before a system file is updated;
wherein the memory processor is configured to:
back up a system mapping table based on the backup instruction, wherein the system mapping table comprises at least one first storage address, and each first storage address corresponds to an address where first system file data is currently stored in the memory;
retain the first system file data in response to that the system file is updated;
store updated second system file data and an updated system mapping table;
determine, in response to detecting a system restore instruction, a third storage address of a to-be-restored target system file in the memory based on a target backup system mapping table indicated by the system restore instruction, wherein the target backup system mapping table is one of system mapping tables backed up by the memory; and
restore, after reading file data of the to-be-restored target system file from the memory according to the third storage address, the to-be-restored target system file.

14. The electronic device according to claim 13, wherein the memory processor is further configured to:

determine, in second system file data, incremental data not belonging to the first system file data; and store the incremental data in the memory.

15. The electronic device according to claim 14, wherein the memory processor is further configured to:

determine a second storage address of the incremental data in the memory;

determine common data between the first system file data and the second system file data; and determine that the updated system mapping table comprises a first storage address of the common data and a second storage address of the common data.

16. The electronic device according to claim 13, wherein the memory processor is further configured to:

detect, in response to determining that an over the air (OTA) upgrade for the system file fails, whether the system restore instruction is received.

17. The electronic device according to claim 13, wherein the device processor is further configured to:
   receive the system restore instruction; or
   generate the system restore instruction.

18. The electronic device according to claim 13, wherein the device processor is further configured to:
   send the system mapping table backed up by the memory to another electronic device, such that the another electronic device determines the target backup system mapping table in the backed-up system mapping table.

* * * * *